US006576176B1

(12) United States Patent
Gebreselassie et al.

(10) Patent No.: US 6,576,176 B1
(45) Date of Patent: *Jun. 10, 2003

(54) METHOD OF RECYCLING SCRAP MATERIAL CONTAINING A THERMOPLASTIC

(75) Inventors: Girma M. Gebreselassie, Southfield; Harold G. Wolf, Jr., Gibralter; Vahid Sendijarevic, Troy; Qavi Anjum, Detroit; Daniel Klempner, West Bloomfield; Kurt C. Frisch, Grosse Ile, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/526,974

(22) Filed: Mar. 16, 2000

(51) Int. Cl.⁷ .......................... B29C 43/20; B29C 70/42
(52) U.S. Cl. ........................ 264/115; 264/122; 264/911; 264/916
(58) Field of Search ................................ 264/115, 112, 264/911, 916, 122

(56) References Cited

U.S. PATENT DOCUMENTS

| 5,075,057 A | 12/1991 | Hoedl |
| 5,185,380 A | 2/1993 | Diessel |
| 5,807,513 A | 9/1998 | Gebreselassie et al. |
| 6,299,811 B1 * | 10/2001 | Gebreselassie et al. ..... 264/115 |

FOREIGN PATENT DOCUMENTS

EP               0 442435 A2      8/1991

OTHER PUBLICATIONS

United Kingdom Patent Office Search Report, dated Jul. 16, 2001.

Girma M. Gebreselassie and Harold G. Wolf of Ut Automotive, Inc. , and Vahid Sendijarevic, Quavi Anjum, Daniel Klempner and Kurt C. Frisch of Polymer Institute, University of Detroit Mercy; Manufacture and Properties of Interior Trim Products From Headliner Scrap, International Congress and Exposition, Detroit, Michigan Mar. 1–4, 1999.

Girma M. Gebreselassie and Harold G. Wolf of Lear Corporation, Technology Division, Southfield, Michigan, and Vahid Sendijarevic, Quavi Anjum, Daniel Klempner and Kurt C. Frisch of Polymer Institute, University of Detroit Mercy, Detroit, Michigan; Utilization of Polyurethane Foam Scrap as a Sole Binder for Recycling of Automotive Interior Trim Products, Polyurethanes Expo '99 , Sep. 12–15, 1999, Orlando, Florida.

United Kingdom Patent Office Search Report, dated Jul. 16, 2001.

\* cited by examiner

*Primary Examiner*—Mary Lynn Theisen
(74) *Attorney, Agent, or Firm*—Brooks & Kushman P.C.

(57) ABSTRACT

The invention involves recycling scrap material having a thermoplastic. The invention includes a method of forming a thermoplastic pre-preg sheet for use in a subsequent molding operation. The method includes shredding a first scrap material having a thermoplastic to form fluff. The fluff has at least about 20 percent weight of thermoplastic. The method further includes sufficiently compacting the fluff into a thermoplastic state sufficient for forming the thermoplastic pre-preg sheet.

15 Claims, 2 Drawing Sheets

| | COMPOSITE COMPOSITION (%) | | | | | | | | | |
|---|---|---|---|---|---|---|---|---|---|---|
| PVC DOOR OFFAL | 100 | - | - | - | 25 | 25 | 33.4 | - | - | - |
| NYLON CARPET OFFAL | - | 100 | 50 | - | 25 | - | - | 50 | 50 | - |
| WOODMAT OFFAL | - | - | - | - | - | 25 | 33.3 | 50 | - | - |
| AUTOMOTIVE HEADLINER SCRAP | - | - | - | 50 | 50 | - | - | - | - | - |
| AUTOMOTIVE SEATING FOAM SCRAP | - | - | - | - | - | 50 | 33.3 | - | 50 | - |
| GLASS FIBER | - | - | - | - | - | - | - | - | - | 50 |
| THERMOFORMING CONDITIONS | | | | | | | | | | |
| TEMPERATURE (°C) | 232 | 205 | 205 | 205 | 205 | 205 | 205 | 205 | 205 | 205 |
| PRESSURE (PSI) | 555 | 280 | 280 | 280 | 835 | 835 | 975 | 695 | 280 | 415 |
| TIME (SEC) | 45 | 10 | 10 | 10 | 25 | 45 | 30 | 45 | 10 | 20 |
| PROPERTIES | | | | | | | | | | |
| DENSITY (g/cc) | 0.72 | 0.76 | 0.83 | 0.83 | 0.83 | 0.88 | 0.93 | 1.10 | 1.10 | 0.89 | 0.81 |
| TENSILE STRENGTH (MPa) | 1.5 | 1.5 | 1.5 | 5.6 | 3.5 | 3.7 | 4.4 | 3.1 | 3.9 | 3.5 |
| ELONGATION (%) | 71 | 3.8 | 10.4 | 6.0 | 5.0 | 9.0 | 2.3 | 12.3 | 2.2 | 3.2 |
| YOUNG'S MODULUS (MPa) | 4.4 | 138 | 73 | 211 | 155 | 169 | 600 | 85 | 727 | 316 |
| FLEXURAL STRENGTH (MPa) | - | 2.3 | 9.5 | 12.1 | 14.7 | 10.2 | 5.4 | - | 8.2 | 5.1 |
| FLEXURAL MODULUS (MPa) | - | 126 | 96 | 235 | 259 | 189 | 453 | - | 171 | 145 |

Fig. 2

METHOD OF RECYCLING SCRAP MATERIAL CONTAINING A THERMOPLASTIC

TECHNICAL FIELD

The present invention relates to an improved method of forming articles from production and/or post-consumer scrap material having a thermoplastic.

BACKGROUND ART

In the manufacture of vehicle parts containing thermoplastics, such as headliners, pillars, side rails, and seats, a large volume of scrap material is typically generated. Moreover, a large volume of post-consumer scrap material having thermoplastics is generated when vehicles are dismantled. Because this scrap material may contain materials other than thermoplastics, such as wood, nylon, thermosets, polyester fabrics, cellulose films, glass fibers, and natural fibers, this scrap material has typically been difficult to recycle. In many cases, this scrap material has been considered to be unrecyclable.

Normally, thermoplastics are recycled by flow processes, such as injection molding and extrusion, which involve pushing melted thermoplastic through the process to create a flow therethrough. Typically, only substantial monoplastic materials may be extruded or injection molded to provide a satisfactory product with substantial uniform density. Due to lack of obtainable flow, scrap material having different thermoplastics and other materials such as nylon, polyester fabrics, glass fibers, wood fibers and thermosets, may not be extruded or injection molded for recycling. Thus, it is desirable to provide a process through which scrap material having thermoplastics and other such materials may be recycled.

A process of recycling scrap material having polyurethane foam is disclosed in U.S. patent application Ser. No. 09/298,132, which is assigned to the Assignee of the present invention and hereby incorporated by reference. This method involves shredding scrap material including a polyurethane foam to form a fluff having a particle size between 0.25 and 1.0 inch, and molding the fluff in a mold at an elevated temperature and pressure, without adding any significant amount of a separate binder. While this invention has industrial potential, the process requires scrap material containing a significant portion of polyurethane foam. It is desirable to recycle scrap material having thermoplastics, either with or without polyurethane foam.

Thus, what is needed is an improved method of recycling scrap material having a thermoplastic, either with or without polyurethane foam.

What is also needed is an improved system for recycling scrap material including a thermoplastic.

What is also needed is an improved method of recycling scrap material having a thermoplastic wherein the method does not require a flow process.

DISCLOSURE OF INVENTION

It is an object of the present invention to provide a method of forming a thermoplastic pre-preg sheet for use in a subsequent molding operation. The method includes shredding a first scrap material having a thermoplastic to form a first fluff. Then, the method includes sufficiently compacting the fluff into a thermoplastic state sufficient for forming a thermoplastic pre-preg sheet.

It is another object of the present invention to provide a method of forming a thermoplastic pre-preg sheet from scrap material having a first thermoplastic wherein the pre-preg sheet is for use in a subsequent molding operation. The method includes shredding the scrap material to form fluff having at least about 20 percent weight of the first thermoplastic. Then, the method includes compacting the fluff into the pre-preg sheet for molding.

It is yet another object of the invention to provide a method of forming an article. The method includes shredding a first scrap material having a first thermoplastic to form a first fluff. The method further includes sufficiently compacting the fluff into a thermoplastic state sufficient for forming a thermoplastic pre-preg sheet and molding the pre-preg sheet to form the article.

BRIEF DESCRIPTION OF DRAWINGS

FIG. 2 is a table illustrating compositions and properties of composites prepared from various scrap materials.

BEST MODE FOR CARRYING OUT THE INVENTION

Figure 1:
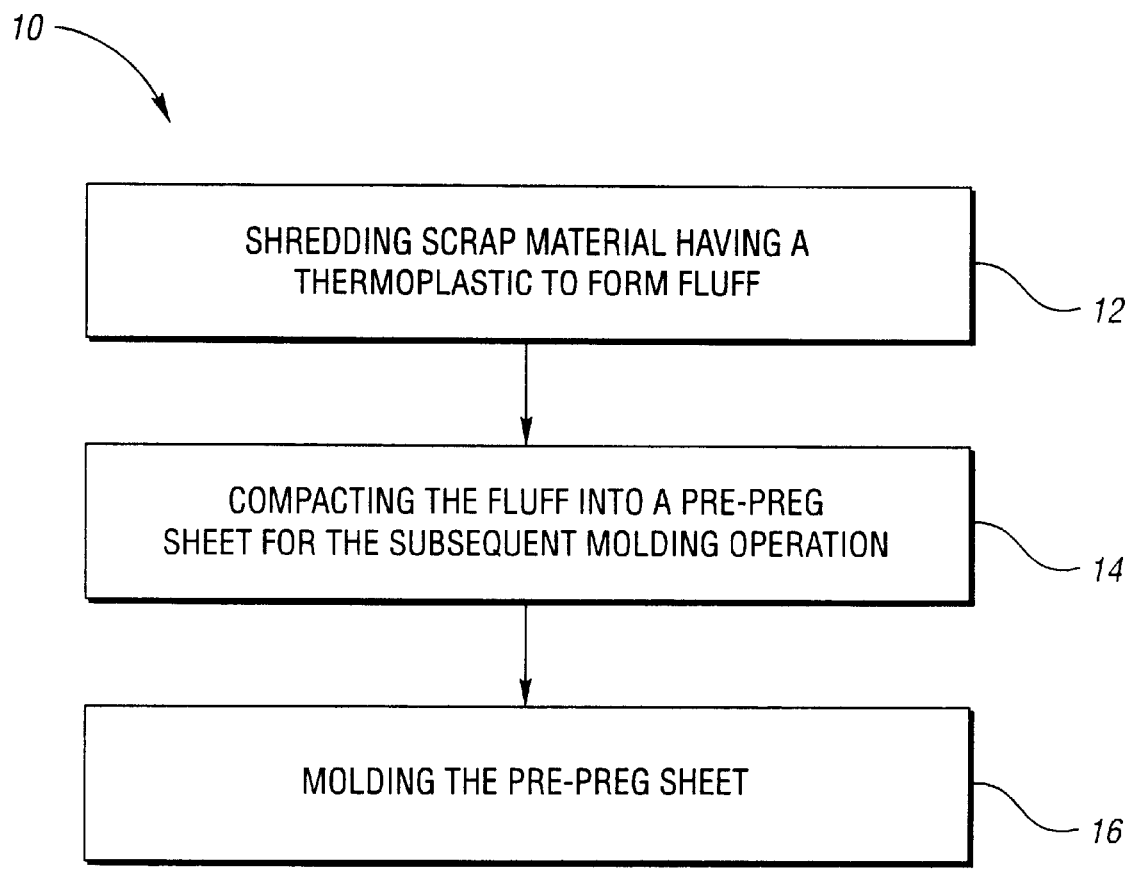
FIG. 1 is a flow chart illustrating one method in accordance with the present invention of recycling scrap material having a thermoplastic.
Figure 3:
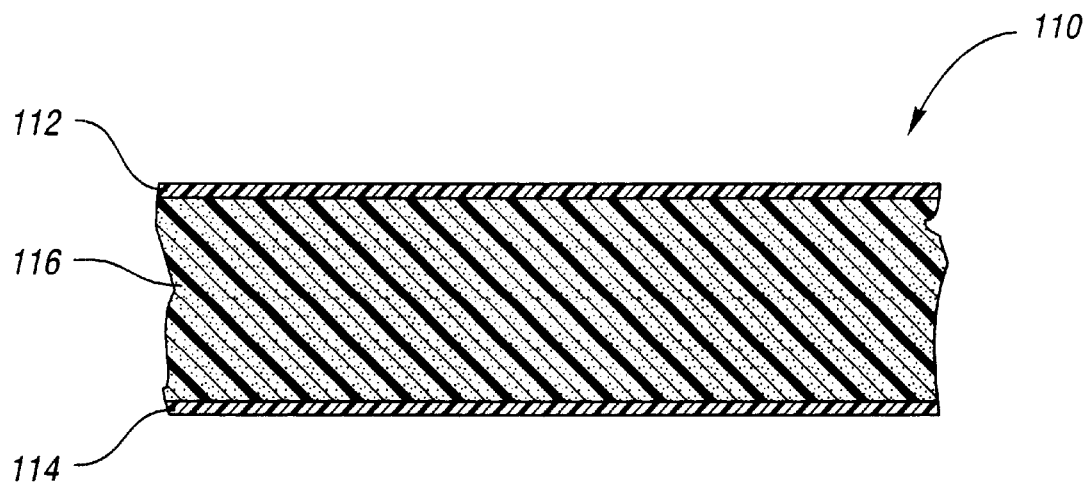
FIG. 3 is a cross-sectional view of a headliner formed by the method of FIG. 1.

FIG. 1 illustrates one method in accordance with the present invention of forming articles from production and/or post-computer scrap material having a thermoplastic. The scrap material having a thermoplastic may be from vehicle components such as interior trim panels, headliners, and seats, as well as from non-vehicle related sources of thermoplastics. The scrap material preferably includes at least about 20% by weight of at least one thermoplastic. While the scrap material need not include any polyurethane foam in carrying out the invention, the scrap material may also include polyurethane foam. The scrap material may also include other materials such as wood, nylon, polyester fabrics, cellulose films, glass fibers, thermosets, and natural fibers. The scrap material may also be from scrap generated during the process of dismantling vehicles.

The scrap material is collected and moved by any suitable means to a shredder, where it is shredded or ground by any suitable means, as shown by box 12, to form shredded waste. The shredded waste is called fluff. For example, the scrap material may be ground by a granulator manufactured by Rapid Granulator, Inc. of Rockford, Ill. Preferably, the fluff has a predetermined particle size ranging between 2–25 millimeters (mm). More preferably, the scrap material is shredded to an average particle size of 4 mm.

The fluff is compacted to form one or more flat pre-preg sheets, as shown by box 14. Preferably, a first carrier film made of suitable materials, such as polyolefin, polypropylene, or polyester is manually placed in a flat sheet mold in communication with a conventional platen press. The mold, for example, may be two feet by two feet in size. The fluff is preferably then placed on the first carrier film. A second carrier film, which is of the same suitable material as the first carrier film, may then be placed over the fluff in the flat sheet mold. The mold is then closed wherein the fluff and the carrier films are compacted at a temperature preferably between about 300° F. (148° C.) and 450° F. (232° C.) using a force between 50 and 400 pounds per square inch (psi) for a time range between about 15 and 60 seconds. As these conditions are reached, it has been unexpectedly found that the scrap material will begin to flow. This provides the pre-preg sheet with a substantially even distribution of the thermoplastic resulting in a substantially uniform density. Thus, the compacted material maintains sufficient rigidity and a desired wall thickness when formed to a predetermined shape. Also, as these conditions are reached, the carrier films adhere to the fluff in side-by-side relationship to provide further rigidity and strength as desired. It is to be noted that as the fluff and the carrier films are compacted at higher temperatures, less force may be applied. For example, at 450° F. (232° C.), a force of 75 psi may be applied, and at 300° F. (148° C.), a force of 375 psi may be applied. It is to be noted that the carrier films are optional and, thus, may not be used in the present invention.

As shown in box 16, the pre-preg sheet can then be formed or molded into a desired shape by compression molding, thermoforming, or any other conventional means to form an article. Such article may be a spare tire cover, a package tray, a center-high-mounted-stop-light (CHMSL) cover, a vehicle trim panel, or any other suitable article as desired. The pre-preg sheets may also be formed into other non-vehicle related articles such as office seats, office furniture, and insulation panels. Preferably, the pre-preg sheet is molded between 400° F. (204° C.) and 475° F. (246° C.) at various pressures over a time period between about 10 and 60 seconds, as shown in FIG. 2. The article may then be trimmed to remove flash therefrom and finished as desired.

In order to combine various scrap materials shown in the table of FIG. 2, a mixing or blending step may be implemented before compacting the fluff. More specifically, a plurality of sets of fluff may be ground in order to combine various scrap materials. Thus, scrap material from a first source such as PVC door offal may be shredded to provide a first set of fluff. Then, scrap material from a second source such as automotive headliner scrap may be shredded to provide a second set of fluff. The first and the second sets of fluff may be combined in desired composite compositions, such as 50%–50% compositions. It is to be noted that other scrap materials having a thermoplastic may be implemented independently or in combination with the scrap materials shown in FIG. 2. For example, the product having the trade name Urocore™ Offal and the product having the trade name Dry Urocore™ Offal, both manufactured by Lear Corporation of Southfield, Mich., may be implemented in combination with the scrap materials shown in FIG. 2.

Preferably, the first and second sets of fluff are vigorously blended or otherwise mixed together with a blender, such as a Zig-Zag blender available from Patterson-Kelley Company of East Stroudsburg, Pa., so as to form a pre-preg mixture. The blender mixes large amounts of particulate material, such as fluff, in order to provide a substantially homogeneous pre-preg mixture and a controlled ratio of the materials. The blender has a mixing chamber and at least two input systems. The blender may have an automatic control mechanism to provide desired compositions of each set of fluff. The pre-preg mixture may then be molded to form one or more pre-preg sheets, as described above.

Optionally, during mixing, the fluff may be combined with a suitable binder to aid in providing a pre-preg mixture. The binder is capable of remaining in a pre-polymerized state for a reasonable time to allow for handling of the pre-preg sheet. Additionally, the binder is capable of curing under production compression molding cycles of 15 to 60 seconds at 100 to 250 degree Celsius with no post curing. Suitable binders include polyisocyanates, polyisocyanates mixed with polyols, and quasi-prepolymers or semi-prepolymers, which are products of isocyanates and polyols having an excess of free isocyanate. Particularly effective polyisocyanates include polymethylene-polyphenyl-polyisocyanate (PMDI); 4,4'-diphenylmethane diisocyanate (MDI); 2,4- and 2,6-toluene-diisocyanate (TDI); or naphthalene-diisocyanate (NDI).

FIG. 2 depicts types of scrap materials which may be used in the method of FIG. 1, although other types not shown may also be used. FIG. 2 shows composite compositions of scrap materials that are used to provide predetermined properties:

EXAMPLE 1

In one example of an automotive interior trim panel produced by the method of the present invention, PVC door offal scrap material was collected and shredded to a particle size less than 4 mm, creating a fluff. The fluff was then moved and placed in a 2 feet by 2 feet compacting mold with a platen press and compacted into a pre-preg sheet at 232° C. and 100 psi. The pre-preg sheet was then subjected to a thermoforming process for 45 seconds at 232° C. and 555 psi. The molded product exhibited physical properties of 0.72 grams/cubic centimeter density, 1.5 MPa tensile strength, 71% elongation, and 4.4 MPa Young's modulus.

EXAMPLE 2

In another example of an interior trim panel produced by the method of the present invention, PVC door offal scrap and automotive headliner scrap were collected and separately shredded to a particle size less than 4 mm, creating a PVC door offal fluff and an automotive headliner fluff. 50 percent by weight of PVC door offal fluff were vigorously mixed with 50 percent by weight of automotive headliner fluff using a Zig-Zag mixer, creating a mixture of fluff. The mixture was then moved and placed in a 2 feet by 2 feet compacting mold with a platen press and compacted into a pre-preg sheet at 232° C. and 100 psi. The pre-preg sheet was then subjected to a thermoforming process for 10 seconds at 205° C. and 280 psi. The molded product exhibited physical properties of 0.83 grams/cubic centimeter density, 1.5 MPa tensile strength, 10.4% elongation, and 73 MPa Young's modulus.

EXAMPLE 3

In another example of an interior trim panel produced by the method of the present invention, nylon carpet offal scrap and woodmat offal scrap were collected and separately shredded to a particle size less than 4 mm, creating a nylon carpet offal fluff and a woodmat offal fluff. 50 percent by weight of nylon carpet offal fluff were vigorously mixed with 50 percent by weight of woodmat offal fluff using a Zig-Zag mixer, creating a mixture of fluff. The mixture was then moved and placed in a 2 feet by 2 feet compacting mold with a platen press and compacted into a pre-preg sheet at 232° C. and 100 psi. The pre-preg sheet was then subjected to a thermoforming process for 45 seconds at 205° C. and 695 psi. The molded product exhibited physical properties of 1.10 grams/cubic centimeter density, 4.4 MPa tensile strength, 2.3% elongation, and 600 MPa Young's modulus.

EXAMPLE 4

In another example of an interior trim panel produced by the method of the present invention, nylon carpet offal scrap and automotive seat foam scrap were collected and separately shredded to a particle size less than 4 mm, creating a nylon carpet offal fluff and an automotive seat foam scrap fluff. 50 percent by weight of nylon carpet offal fluff were vigorously mixed with 50 percent by weight of automotive seat foam scrap fluff using a Zig-Zag mixer, creating a mixture of fluff. The mixture was then moved and placed in a 2 feet by 2 feet compacting mold with a platen press and compacted into a pre-preg sheet at 232° C. and 100 psi. The pre-preg sheet was then subjected to a thermoforming process for 10 seconds at 205° C. and 280 psi. The molded product exhibited physical properties of 1.10 grams/cubic centimeter density, 3.1 MPa tensile strength, 12.3% elongation, and 85 MPa Young's modulus.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming a thermoplastic pre-preg sheet for use in a subsequent molding operation, the method comprising:

shredding a first scrap material having a first thermoplastic to form a first fluff;

shredding a second scrap material having a second thermoplastic to form a second fluff;

combining the first fluff with the second fluff to form a combined fluff; and sufficiently compacting the combined fluff into a thermoplastic state sufficient to form the thermoplastic pre-preg sheet.

2. The method of claim 1 wherein the first scrap material includes at least 20% weight of the first thermoplastic.

3. The method of claim 1 wherein the combination of the first and second scrap materials includes at least 20% weight of a combination of the first and second thermoplastics.

4. The method of claim 1 wherein compacting the combined fluff is performed at temperatures between about 300 and 450 degrees Fahrenheit, pressures between about 50 and 400 pounds per square inch, and time ranges between about 15 and 60 seconds.

5. The method of claim 1 further including molding the pre-preg sheet at an elevated temperature and pressure over a time period to form an article.

6. The method of claim 5 wherein the elevated temperature is between about 350 and 475 degrees Fahrenheit, the elevated pressure is between about 200 and 1050 pounds per square inch, and the time period is between about 10 and 60 seconds.

7. The method of claim 1 further comprising:

placing a carrier film adjacent the combined fluff prior to the compacting step.

8. The method of claim 1 further comprising:

combining the combined fluff with a binder prior to the compacting step.

9. A method of forming an article, the method comprising:

shredding a first scrap material having a first thermoplastic to form a first fluff;

shredding a second scrap material having a second thermoplastic to form a second fluff;

combining the first fluff with the second fluff to form a combined fluff;

sufficiently compacting the combined fluff into a thermoplastic state sufficient for forming a thermoplastic pre-preg sheet; and molding the pre-preg sheet to form the article.

10. The method of claim 9 wherein the first scrap material includes at least 20% weight of the first thermoplastic.

11. The method of claim 9 wherein the combination of the first and second scrap materials includes at least 20% weight of a combination of the first and second thermoplastics.

12. The method of claim 9 wherein compacting the combined fluff is performed at temperatures between about 300 and 450 degrees Fahrenheit, pressures between about 50 and 400 pounds per square inch, and time ranges between about 15 and 60 seconds.

13. The method of claim 9 wherein molding the pr-preg sheet includes molding the pre-preg sheet at an elevated temperature and pressure over a time period to form the article.

14. The method of claim 13 wherein the elevated temperature is between about 350 and 475 degrees Fahrenheit, the elevated pressure is between about 200 and 1,050 pounds per square inch, and the time period is between about 10 and 60 seconds.

15. The method of claim 9 wherein the fluff has a predetermined particle size between about 2 and 25 millimeters in length.

* * * * *

UNITED STATES PATENT AND TRADEMARK OFFICE
CERTIFICATE OF CORRECTION

PATENT NO.     : 6,576,176 B1                         Page 1 of 1
DATED          : June 10, 2003
INVENTOR(S)    : Girma M. Gebreselassie et al.

It is certified that error appears in the above-identified patent and that said Letters Patent is hereby corrected as shown below:

<u>Column 6,</u>
Line 34, delete "pr-preg" and insert -- pre-preg -- therefor.

Signed and Sealed this

Ninth Day of September, 2003

JAMES E. ROGAN
*Director of the United States Patent and Trademark Office*